Aug. 12, 1958

W. BRANDL 2,846,938

HOUSEHOLD APPLIANCE FOR THE PREPARATION OF HOT BEVERAGES

Filed Feb. 2, 1955

2,846,938

HOUSEHOLD APPLIANCE FOR THE PREPARATION OF HOT BEVERAGES

Wilhelm Brandl, Zurich, Switzerland

Application February 2, 1955, Serial No. 485,767

Claims priority, application Switzerland February 5, 1954

1 Claim. (Cl. 99—281)

The present invention relates to a household appliance for the preparation of hot beverages by the infusion of substances of the group consisting of coffee and tea with boiling water.

It is the principal object of the invention to provide an applicance of the kind referred to the switching-on-and-off of which is effected fully automatically, so that the user has nothing to do with it at all.

With these and other objects in view, I provide an appliance comprising in combination: a pedestal, a container for the cold water to be heated and a container for the hot beverage both mounted on the said pedestal, an electrically heatable through flow heater, a riser pipe in communication with the outlet of the said heater, a pipe in communication at its entry with the said container for the cold water and at its exit with the entrance of the said through flow heater, a membrane responsive to the water pressure in the said container for the cold water, a switch operatively connected to the said membrane and controlling the current supply to the said heater, the said membrane switching the said switch automatically on when water is filled into the said container for cold water, and automatically switching the same off when the said container is emptied.

These and other objects and features of my invention will be clearly understood from the following description of a preferred embodiment thereof given by way of example with reference to the accompanying drawing, in which.

Figure 1:
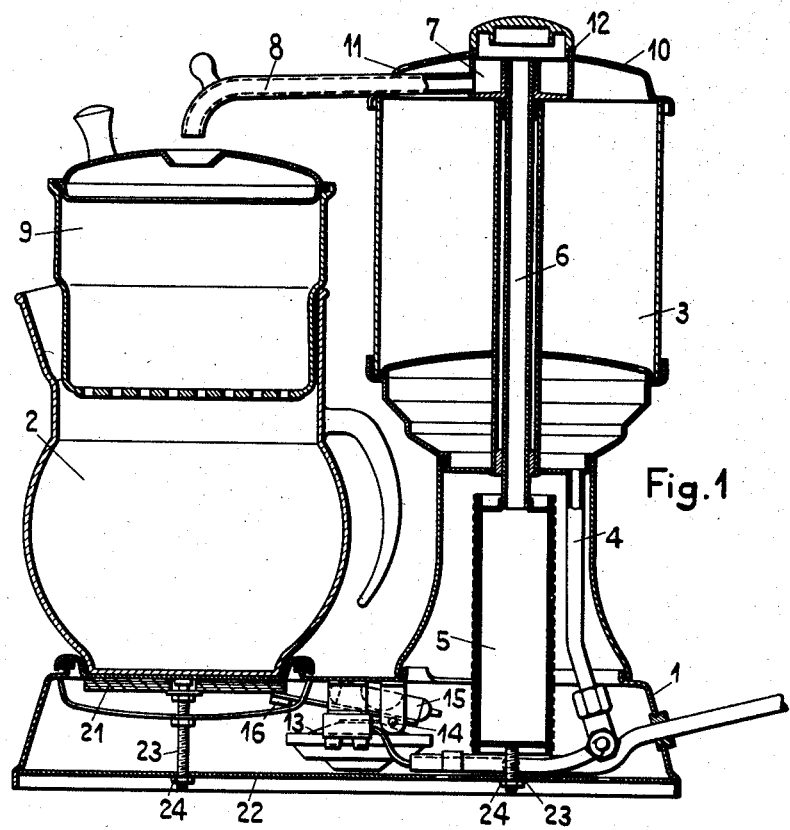
Fig. 1 is a sectional elevation.

In Fig. 1 the pedestal of the appliance illustrated is denoted 1, on which there are arranged the beverage container 2 and the cold water container 3. A pipe 4 connects the container 3 with a through flow heater 5, on the top of which a riser tube 6 is arranged. The upper orifice of this riser pipe lies above the highest water level in the container 3. The tube 6 leads to a rotatably mounted receiver cup 7, which has a spout 8 which can be adjusted over a scalding vessel 9 adapted to be inserted into the beverage container 2. The lid 10 of the container 3 has a slot 11 and a round aperture 12.

Figure 2:
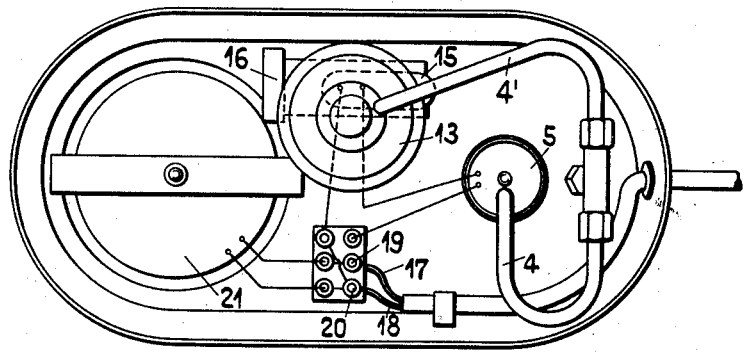
Fig. 2 is a plan view of the said embodiment, the cover plate having been omitted for clarity.

The pipe 4 has a branch 4' (Fig. 2) which transmits the pressure of the water in the container 3 on to a membrane 13. The latter acts on a mercury switch cradle 15 pivotally mounted at 14, having a counterpoise 16. The current supply takes place over the conductors 17, 18 to the terminals 19, 20. The heater plate 21 for the container 2 is directly connected to the terminals 19, 20. This plate has an output of e. g. 30 watts. The heater 5, which has an output of e. g. 600 watts, is connected to the terminals through the cradle 15. A closure plate 22 is fixed by means of bolts 23 and of the nut 24.

The appliance described operates as follows:

Cold water is poured into the container 3. The membrane 13 acts on the cradle 15, whereby the heater 5 is switched on, the water rises, owing to its being heated, through the tube 6 and overflows over the cup 7 and the spout 8 into the scalding vessel 9. As soon as the water in the container 3 has dropped below a certain level, the membrane 13 switches the cradle switch 15 off again, and the circuit of the heater 5 is interrupted.

The dimensions of the machine are so selected, that the capacity of the contaier 3 corresponds to that of the container 2.

While I have herein described and illustrated in the accompanying drawings what may be considered a typical and particularly useful embodiment of my said invention, I wish it to be understood that I do not limit myself to the particular details and dimensions described and illustrated, for obvious modifications will occur to a person skilled in the art.

What I claim as my invention and desire to secure by Letters Patent, is:

A household appliance for the preparation of hot beverages by the infusion of substances of the group consisting of coffee and tea, with boiling water, comprising in combination: a pedestal, a removable dispenser container for the hot beverage and a container for the cold water to be heated mounted on said pedestal, infusion means on top of said removable container, an electrically heatable through flow heater supported by said pedestal and disposed below the container for the cold water, a riser pipe in communication with an outlet at the top of the said heater and extending through the container for the cold water, said riser pipe being insulated from the cold water, a pipe connecting said outlet and ending with a spout over said infusion means, a pipe in communication at its entry with the container for the cold water and at its exit with an inlet at the bottom of the said through flow heater, a membrane responsive to water pressure carried by said pedestal, a switch mounted in said pedestal operatively connected to the said membrane and controlling a current supply to the said heater, and a branch leading from said last named pipe to the membrane for transmitting the pressure of water in the container for the cold water thereto, whereby said switch is automatically switched on by said membrane when water is filled into the container for cold water, and automatically switched off when said container is emptied.

References Cited in the file of this patent

UNITED STATES PATENTS

| Re. 22,879 | Peters et al. | May 13, 1947 |
|---|---|---|
| 1,816,994 | Armstrong | Aug. 4, 1931 |
| 2,088,728 | Stranszky | Aug. 3, 1937 |
| 2,180,655 | Abbate | Nov. 21, 1939 |
| 2,422,580 | Meier | June 17, 1947 |
| 2,459,305 | Brandl | Jan. 18, 1949 |
| 2,583,077 | Arney | Jan. 22, 1952 |
| 2,644,866 | Turnupseed et al. | July 7, 1953 |

FOREIGN PATENTS

| 196,940 | Switzerland | July 1, 1938 |
|---|---|---|
| 529,159 | Great Britain | Nov. 14, 1940 |